United States Patent [19]

Derbyshire

[11] 4,094,523
[45] June 13, 1978

[54] DRILL CHUCKS

[75] Inventor: George Cecil Derbyshire, Sheffield, England

[73] Assignee: The Jacobs Manufacturing Company, Limited, Sheffield, England

[21] Appl. No.: 742,867

[22] Filed: Nov. 18, 1976

[30] Foreign Application Priority Data

Nov. 24, 1975 United Kingdom ............... 48247/75

[51] Int. Cl.$^2$ ............................................. B23B 31/04
[52] U.S. Cl. ........................................ 279/62; 279/16
[58] Field of Search ..................... 279/62, 61, 16, 1 L, 279/63, 64, 65

[56] References Cited

U.S. PATENT DOCUMENTS

| 1,288,324 | 12/1918 | Weir | 279/64 |
| 2,475,386 | 7/1949 | Frisco | 279/16 |
| 3,949,998 | 4/1976 | Dietzen | 279/62 |

Primary Examiner—Gil Weidenfeld
Attorney, Agent, or Firm—Stephen J. Rudy

[57] ABSTRACT

A drill chuck including a main body part having jaws slidably mounted for converging movement in respective guides. A nut member is rotatably mounted on said main body part and has screwthreaded engagement with the jaws. A cylindrical sleeve is connected at one end to the nut member and at its other end surrounds a portion of a further body part. The further body part, which is provided with mounting means for connecting the chuck to a power tool driving spindle, has an initial degree of co-axial alignment with the main body part but a self-centering action is allowed when drilling.

9 Claims, 14 Drawing Figures

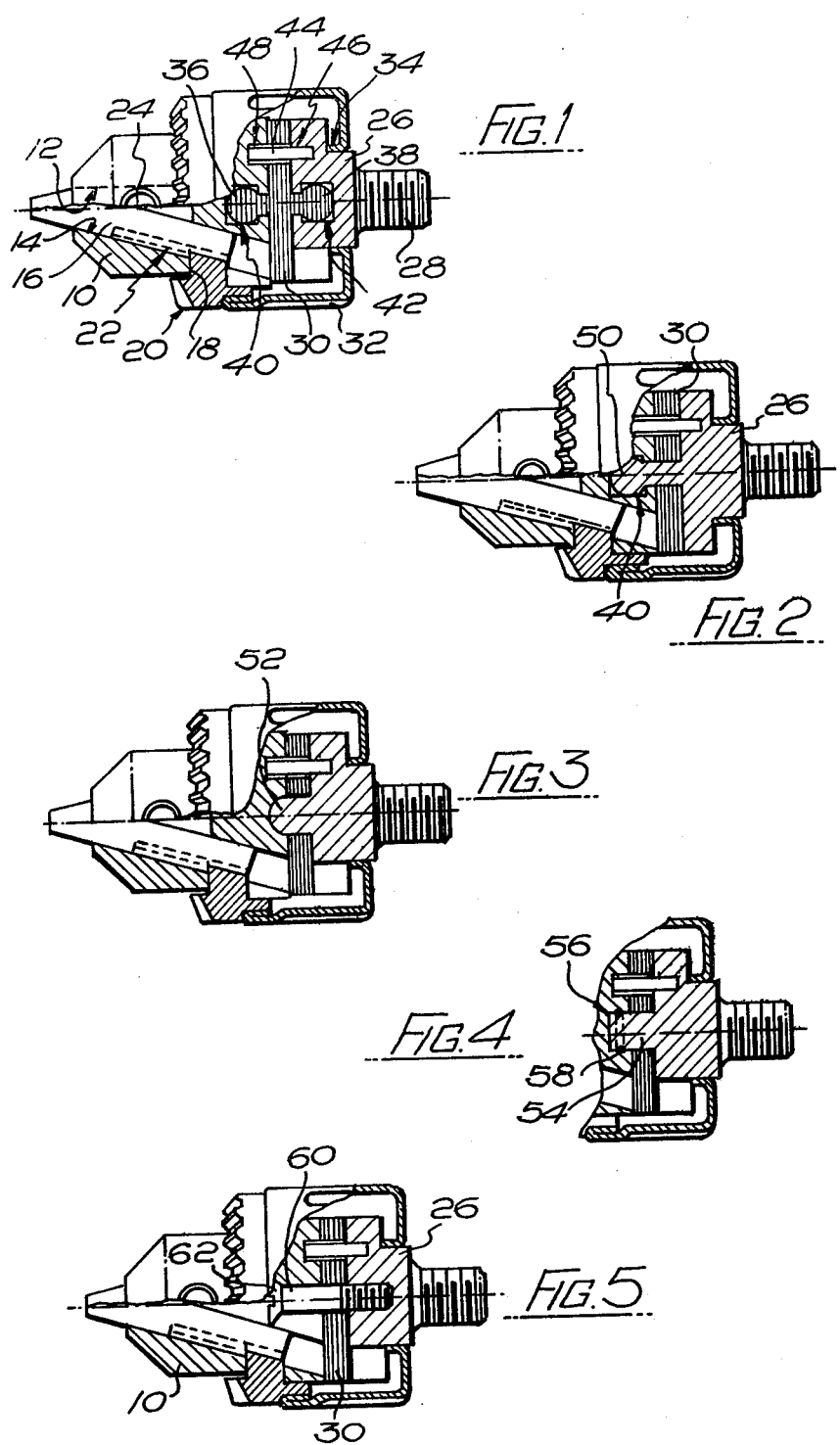

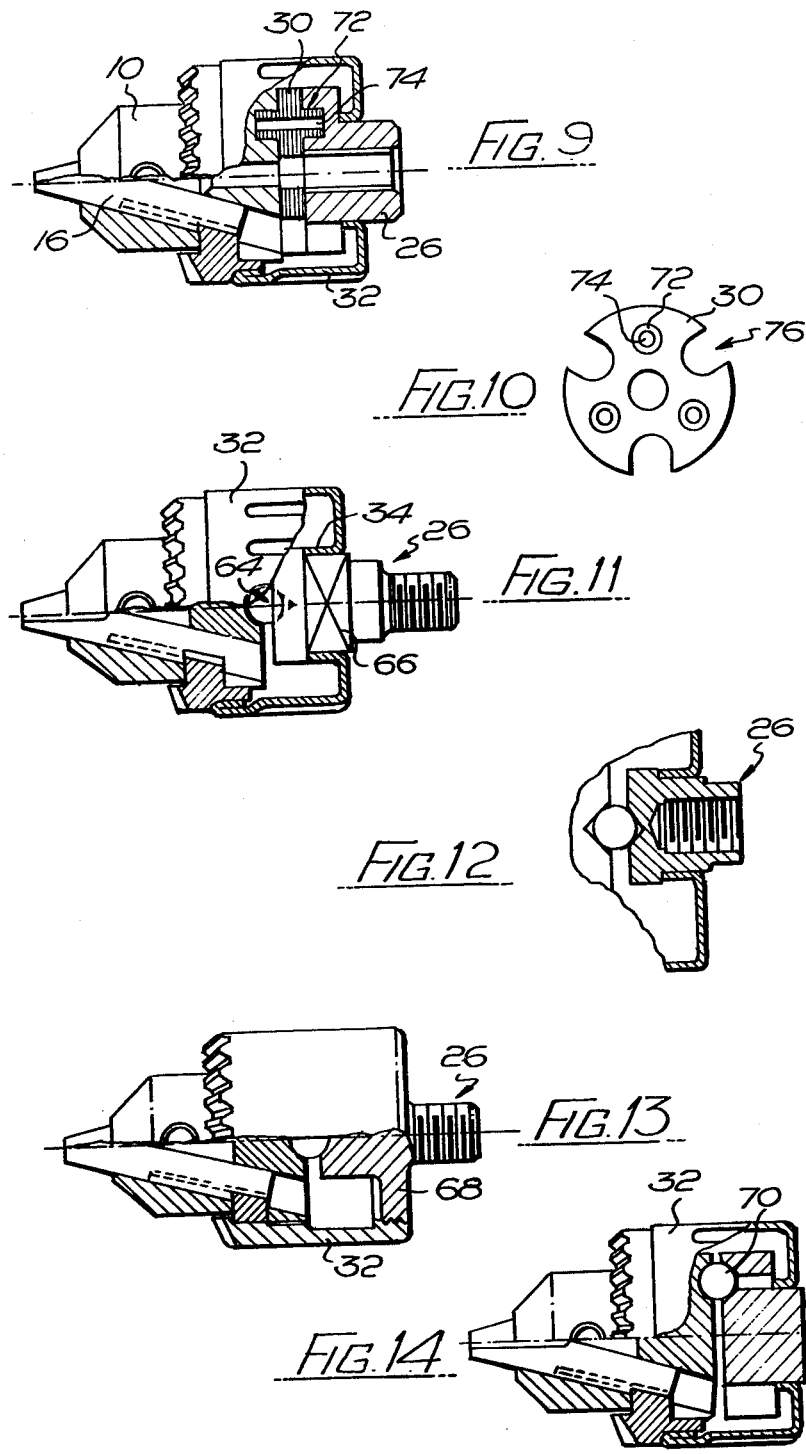

DRILL CHUCKS

The invention relates to drill chucks and has objects which will become apparent from the accompanying description.

According to the invention, there is provided a drill chuck comprising a main body part; jaws slidably mounted for converging movement in respective guides in said main body part; a nut member rotatably mounted on said main body part but axially located in a circumferential groove encircling said body part, said nut member having screwthreaded engagement with said jaw members; a bevel gear element with which an extraneous chuck key may be engaged for adjusting the jaws; a further body part which provides a mounting means for connecting the chuck to a power tool driving spindle; a cylindrical sleeve which is connected at one end to said nut member and at its other end surrounds a portion of said further body part; and means located between the main body part and the further body part for retaining them in position with an initial degree of co-axial alignment whilst allowing a self-centering action when drilling. A resilient disc may be located between the main body part and said further body part and a driving connection may be established between said main body part and said further body part by means of a plurality of pins which extend through the resilient disc into holes in said main body part and said further body part. The means for retaining the main body part and further body part in position with an initial degree of co-axial alignment whilst allowing a self-centering action when drilling may include two ball-like projections formed co-axially on opposite sides of the resilient disc and received respectively in recesses formed in adjacent faces of the main body part and of said further body part. On the other hand said means may include a ball like projection formed on one of said two parts and received in a depression in the other of said two parts.

The means provided for retaining the main body part and further body part in position with an initial degree of coaxial alignment whilst allowing a self-centering action when drilling may include a screw extending through a clearance hole formed axially of one of said two parts and engaging a screwthreaded hole in the other of said two parts.

A spring steel spacer element may be located between the two body parts and a driving connection established between them by pairs of driving fingers which extend radially outwards from a flat apertured centre portion of the spacer element, the radially outer ends of said driving fingers being turned through right angle so that a tab portion of one of each pair project in one direction and a tab portion of the other of each pair projects in the other direction, the periphery of the further body part being longitudinally slotted to receive those tab portions of the spacer element which project in one direction and a peripheral portion of the main body part being similarly slotted for the reception of those tab portions of the spacer element which project in the other direction. A steel ball may be located at the axis of the chuck between the two body parts and in this case a driving connection between them may be established indirectly through the cylindrical sleeve, a part of which surrounds a portion of said further body part non-rotatably, whereby torque applied to the chuck from the power tool driving spindle when drilling tends to rotate the nut relative to the main body part to tighten the jaws. On the other hand, a plurality of steel balls may be located in respective seatings in adjacent faces of the two body parts, said steel balls being equally spaced on a common pitch circle diameter.

In order that the invention may be fully understood and readily carried into effect, the same will now be described, by way of example only, with reference to the accompanying drawings, of which:

FIG. 1 is a part-sectional view of a drill chuck embodying the invention, and

FIGS. 2 to 14 are views of possible modifications which will presently be referred to.

Figure 6:
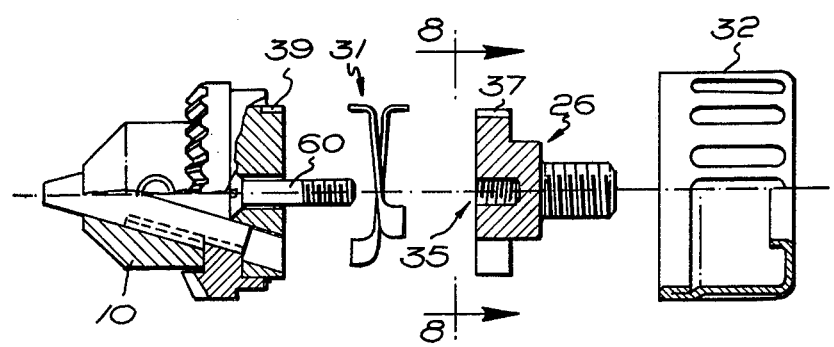

Referring now to FIG. 1 of the drawings, the drill chuck there illustrated includes a main body part 10 having at one end an axially extending bore 12 for the reception of a drill shank (not shown). Three equally spaced bores 14, only one of which is shown in the drawing, diverge from the axially extending bore for the reception of respective jaws 16, the jaws being slidably mounted in the bores 14 so that as they are advanced they grip a drill shank between parallel end portions and when they are retracted into the main body part they release the drill shank.

A circumferential groove 18 is formed around the main body part near its other end and breaks into the bore 14. An integral nut and bevel gear element 20, which is formed in halves, engages said groove so that the tapering internal thread of the nut engages thread elements 22 which are formed on the jaws. The bevel gear part of the assembled element 20 surrounds a cylindrical portion of the main body part in which three equally spaced radial blind bores 24 are formed, the latter being provided for the reception of a pilot end of a chuck key (not shown) having a bevel pinion capable of engaging the teeth of the bevel gear whereby the jaws can be simultaneously advanced or retracted to the extent required by rotating the actuating member constituted by the integral nut and bevel gear element.

A further body part 26 provides a mounting means for connecting the chuck to a power tool driving spindle, being provided with a screwthreaded spigot portion 28 for that purpose. A moulded rubber disc 30 is located between the main body part and said further body part, as shown.

The main body part 10, disc 30 and further body part 26 are held in abutting relation by means of a longitudinally fluted cylindrical sleeve 32 which has been formed as a metal pressing from relatively light gauge metal plate. One end of said sleeve is completely inturned and tightly surrounds a stepped portion of the integral nut and bevel gear element to hold the two halves of the latter together. At its other end the sleeve is turned under so as to form a plain sleeve portion 34 in which is located a cylindrical portion of the further body part 26, an end surface of said sleeve portion abutting against a portion of said further body part to press it against the rubber disc.

Means are provided for holding the main body part and said further body part together with an initial degree of co-axial alignment said means being constituted by two ball-like projections 36 and 38 which are formed co-axially on opposite sides of the rubber disc and which are received respectively in recesses 40 and 42 formed in adjacent faces of the main body part and of said further body part.

A driving connection is established between the main body part and the further body part by means of a plurality of pins 44 which extend through clearance holes in the rubber disc 30 and into holes in the main body part and said further body part. The pins are a tight fit in the holes 46 into which they extend in said further body part but the holes 48 into which they extend in the main body part are clearance holes.

It has been found that the fact that the main body part can move very slightly relative to the further body part (although as previously stated they are held together with an initial degree of co-axial alignment) allows a self-centering action of said main body part to take place when the point of a drill bit which is held in the chuck contacts a workpiece.

Referring now to FIG. 2, the drill chuck there illustrated is generally similar to that shown in FIG. 1 except that in this case the rubber disc 30 has a central aperture through which extends a ball-like projection 50 which has been formed integrally with the further body part 26. The projection 50 is received in the recess 40 in the main body part (which is in this case made of a synthetic plastics material and the ball-like projection 50 is thus able to "snap" into the recess 40) and the function of the chuck is substantially the same as that of the chuck illustrated in FIG. 1 in the sense that the manner in which the main body part and said further body part are connected together ensures an initial degree of co-axial alignment between the two whilst the few thousandths of an inch of radial clearance around the ball-like projecting 50 within the recess 40 allows the required self-centering action of said main body part to take place as soon as drilling commences.

In a modification of the construction just described, and which is illustrated in FIG. 3, the ball-like projection 50 has been replaced by a domed portion 52 which engages a seating formed by a dimple in the main body part.

Referring now to FIG. 4, in a further modification to the chuck described with reference to FIG. 2, the ball-like projection 50 has been replaced by a generally cylindrical projection 54 which is received in a cylindrical blind bore 56 in the main body part. A split ring 58 engages matching grooves in the projection 54 and in the bore 56 and acts to hold the parts together during assembly of the chuck. The chuck functions in exactly the same way as those illustrated in FIGS. 1 to 3 as regards the ability of the main body part to self-centre by virtue of the fact that the cylindrical projection has a limited amount of radial clearance within the bore 56.

Referring to FIG. 5, in another modification the drill chuck is again basically similar to that shown in FIG. 1 but in this case the rubber disc 30 has a central aperture through which extends a screw 60 which holds the main body part 10 and further body part 26 together with an initial degree of co-axial alignment. However, the clearance hole in the main body part through which the screw extends, and the fact that the two body parts are not tightly screwed together, allows the main body part to self-centre as soon as drilling commences. This is facilitated also by the fact that the screw head 62 is of a generally countersunk screw head shape but is slightly rounded like the segment of a ball and this seats in a countersunk seating in the main body part.

Figure 7:
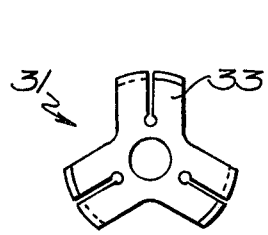
Figure 8:
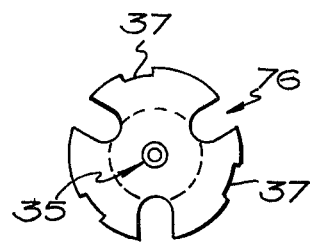

Referring now to FIGS. 6 to 8, in a modification of the chuck just described the rubber disc has been replaced by a spring steel spacer element, generally indicated 31, which as shown in FIG. 7 comprises a flat apertured centre portion with three equally spaced pairs of radially extending driving fingers 33. At their radially outer ends the pairs of driving fingers have tab portions turned through a right angle as shown, one of each pair being turned to project in one direction and the other of each pair being turned to project in the opposite direction. The further body part 26 is generally the same as that of the chuck of FIG. 5, having a central screw-threaded hole 35 for the reception of the screw 60 and three equally spaced aperture 76 which extend inwards from its periphery to allow the free passage of portions of the jaws into the space surrounded by the sleeve 32. However, as best seen in FIG. 8, it is provided at its periphery with longitudinally extending slots 37 which are arranged to receive those tab portions of the spacer element which project in one direction. A peripheral portion of the main body part 10 is provided with similar longitudinally extending slots 39 which are arranged to receive those tab portions of the spacer element which project in the other direction.

The arrangement is such that when the chuck is assembled, the screw 60 draws the main body part and further body part together to such an extent that the driving fingers are slightly pre-loaded so that they maintain the two body parts in spaced relation with their adjacent flat faces in parallelism and with an initial degree of co-axial alignment. However, the flexibility of the spring steel spacer element which transmits drive from the further body part to the main body part is such that when a drill bit is held in the chuck contacts a workpiece a self-centering action of said main body part can take place.

In FIG. 9 there is illustrated a modified form of chuck again very similar to that shown in FIG. 1 but which, although the rubber disc is provided with a central aperture, still relies upon the rubber disc to provide the initial degree of co-axial alignment between the main body part 10 and the further body part 26. As shown, the rubber disc 30 has in this case been moulded with three equally spaced driving elements 72 which project from opposite sides of the disc on a common pitch circle diameter, the opposite ends of said driving elements being received in complementary depressions in the adjacent faces of the main body part and the further body part. Respective steel pins 74 extend through the driving elements to reinforce them.

The rubber disc 30 which is used in the modified form of chuck just described is shown in end view in FIG. 10 and it will be seen that it is provided with three equally spaced apertures 76 which extend inwards from its periphery. These are provided to allow the free passage of portions of the chuck jaws 16 into the space surrounded by the sleeve 32. The chuck is otherwise the same as that previously described with reference to FIG. 1 (except that the further body part 26 happens to have been illustrated with an internally screwthreaded bore instead of with an externally screwthreaded spigot portion).

The chuck just described with reference to FIGS. 9 and 10 operates in a very similar manner to that previously described with reference to FIG. 1. The driving elements 72 of the rubber disc, reinforced by the steel pins 74, provide the driving connection between the main body part and further body part and also provide the initial degree of co-axial alignment between the two body parts. However, the looseness of fit of the driving elements in the complementary depressions in the main body part and or in the further body part, and for the degree of resilience of the rubber disc, is such that when a drill bit which is held in the chuck contacts a workpiece a self-centering action of said main body part can take place (and of course it will be understood that the optimum clearances and/or the optimum resilience of the rubber disc may be determined by trial and experiment).

Referring now to FIG. 11, the drill chuck there illustrated is generally similar to that originally described with reference to FIG. 1 but the moulded rubber disc 30 has been omitted and a steel ball 64 has been located at the axis of the chuck between the main body part and the further body part, said ball being seated in respective dimples in adjacent faces of the main body part and said further body part, as shown. A further difference resides in the fact that a driving connection between the main body part and the further body part is established indirectly through the cylindrical sleeve 32. The completely inturned end of said sleeve tightly surrounds the stepped portion of the integrally formed nut and bevel gear element to hold the two halves of the latter together as before, but at its other end the sleeve is in this case non-rotatably located on a square section portion 66 of the further body part 26, the inturned sleeve portion 34 of the sleeve 32 having been extended in length and formed to define a square aperture for engagement with said square section portion.

The fact that the driving connection between the body part 10 and the further body part 26 is established indirectly through the cylindrical sleeve 32 in the manner described causes the chuck to be self-tightening. That is to say, torque applied to the chuck from the power tool driving spindle when drilling tends to rotate the nut relative to the main body part to tighten the jaws.

Referring to FIG. 12, in a modification of the chuck just described, the further body part 26 is provided with a screwthreaded bore instead of a screw-threaded spigot portion. A further modification which could be made is that the non-circular driving portion 66 of the further body part, and the inturned sleeve portion of complementary shape, need not necessarily be of square form but could for example be hexagonal or could be circular with a pair of oppositely disposed flats.

In a further modification illustrated in FIG. 13, and which also has the self-tightening characteristics referred to above, the sleeve 32 is shown to have been machined from the solid instead of being formed as a pressing (and in fact is shown as having been formed integrally with the bevel gear element). The further body part 26 has been formed with a flange portion 68 and the periphery of the latter has screwthreaded engagement with the sleeve as shown. When the flange portion 68 is screwed into the threaded portion of the sleeve and tight against the internal shoulder in the sleeve, a self-tightening, self-centering action of the chuck is achieved.

Finally, in FIG. 14 there is illustrated a further construction basically similar to that previously described with reference to FIG. 1 but in which the rubber disc 30 has been replaced by three steel balls 70 (only one of which is shown in the drawing) located in respective seatings in adjacent faces of the body part 10 and further body part 26, said balls being equally spaced apart on common pitch circle diameters. The three steel balls produce the self-centering action between the main body part and further body part when drilling. The sleeve 32 acts to urge the main body part and further body part together so that they grip the steel balls between them and said balls thus constitute the driving connection between the two body parts.

Various other modifications may be made without departing from the scope of the invention. For example, it will be understood that in the drill chucks illustrated in FIGS. 1 and 2 the ball-like projections need not be snap fits into the recesses in which they are received but that this facilitates assembly, that is holds the main body part, rubber disc and further body part together until the cylindrical sleeve 40 is fitted in position. Similarly, the spring ring 58 in the chuck illustrated in FIG. 4 is not essential. In another modification the cylindrical sleeve 32 could be replaced by a sleeve of moulded synthetic plastics material. This could preferably be reinforced, at the end surrounding the halves of the integral nut and bevel gear element, by a metal band, that is in those cases in which the nut and bevel gear element are formed integrally together and which thus require to be formed in halves so that the nut can be engaged in the groove 18. On the other hand of course, the nut and bevel gear element need not necessarily be formed integrally together in which case only the nut need be formed in halves. It will also be understood that in any of the chucks described the further body part 26 may be adapted for connection to any kind of power tool driving spindle, that is to say for example it may be provided with an internally screwthreaded recess or with a screwthreaded spigot portion 28, or with a Morse taper shank portion. Although only the main body part of the chuck illustrated in FIG. 1 has been specifically described as being made of a synthetic plastics material it will be understood that in fact the main body part of any of the chucks described herein could be made of such material (but of course they could equally well be made of metal). It will of course also be understood that the resilient disc which may be located between the main body part and the further body part may be made of a resilient synthetic plastics material, such as polythene, instead of rubber.

What I claim and desire to secure by Letters Patent is:

1. A drill chuck comprising a main body part; jaws slidably mounted for converging movement in respective guides in said main body part; a nut member rotatably mounted on said main body part but axially located in a circumferential groove encircling said body part, said nut member having screwthreaded engagement with said jaw members; said nut member including a bevel gear element with which an extraneous chuck key may be engaged for adjusting the jaws; a further body part which provides a mounting means for connecting the chuck to a power tool driving spindle; a cylindrical sleeve which is connected at one end to said nut member and at its other end surrounds a portion of said further body part; and means located between the main body part and the further body part for retaining them in position with an initial degree of co-axial alignment whilst allowing a self-centering action when drilling.

2. A drill chuck comprising a main body part; jaws slidably mounted for converging movement in respective guides in said main body part; a nut member rotatably mounted on said main body part but axially located in a circumferential groove encircling said body part, said nut member having screwthreaded engagement with said jaw members; said nut member including a bevel gear element with which an extravenous chuck key may be engaged for adjusting the jaws; a further body part which provides a mounting means for connecting the chuck to a power tool driving spindle, a cylindrical sleeve which is connected at one end to said nut member and at its other end surrounds a portion of said further body part; self-centering action means located between the main body part and the further part for retaining them in position with an initial degree of co-axial alignment whilst allowing a self-centering action when drilling, said self-centering action means including a resilient disc located between the main body part and said further body part and a driving connection is established between said main body part and said further body part by means of a plurality of pins which extend through the resilient disc into holes in said main body part and said further body part.

3. A drill chuck as claimed in claim 2, in which the means for retaining the main body part and further body part in position with an initial degree of co-axial alignment whilst allowing a self-cleaning action when drilling includes two ball-like projections formed co-axially on opposite sides of the resilient disc and received respectively in recesses formed in adjacent faces of the main body part and of said further body part.

4. A drill chuck as claimed in claim 2, in which the means provided for retaining the main body part and further body part in position with an initial degree of co-axial alignment whilst allowing a self-centering action when drilling includes a ball-like projection formed on one of said two parts and received in a depression in the other of said two parts.

5. A drill chuck as claimed in claim 2, in which the means provided for retaining the main body part and further body part in position with an initial degree of co-axial alignment whilst allowing a self-centering action when drilling includes a screw extending through a clearance hole formed axially of one of said two parts and engaging a screwthreaded hole in the other of said two parts.

6. A drill chuck as claimed in claim 1, in which a spring steel spacer element is located between the main body part and the further body part and a driving connection is established between the main body part and said further body part which provides a mounting means for connecting the chuck to a power tool driving spindle by pairs of driving fingers which extend radially outward from a flat apertured centre portion of the spacer element, the radially outer ends of said driving fingers being turned through right angles so that a tab portion of one of each pair projects in one direction and a tab portion of the other of each pair projects in the other direction, the periphery of the further body part being longitudinally slotted to receive those tab portions of the spacer element which project in one direction and a peripheral portion of the main body part being similarly slotted for the reception of those tab portions of the spacer element which project in the other direction.

7. A drill chuck as claimed in claim 1, in which a steel ball is located at the axis of the chuck between the main body part and the further body part.

8. A drill chuck as claimed in claim 7, in which a driving connection between the main body part and the further body part is established indirectly through the cylindrical sleeve, a part of which surrounds a portion of said further body past non-rotatably, whereby torque applied to the chuck from the power tool driving spindle when drilling tends to rotate the nut relative to the main body part to tighten the jaws.

9. A drill chuck as claimed in claim 1, in which a plurality of steel balls are located in respective seatings in adjacent faces of the main body part and the further body part, said steel balls being equally spaced on a common pitch circle diameter.

* * * * *